Jan. 12, 1971 W. J. RICHARDS 3,555,539

ALPHA-NUMERIC DISPLAY DEVICE

Filed Jan. 3, 1968 2 Sheets-Sheet 1

INVENTOR,

William J. Richards

BY: Harry M. Saragovitz, Edward J. Kelly & R. P. Gibson ATTORNEYS.

Jan. 12, 1971 W. J. RICHARDS 3,555,539
ALPHA-NUMERIC DISPLAY DEVICE
Filed Jan. 3, 1968 2 Sheets-Sheet 2

INVENTOR
William J. Richards

BY: Harry M. Saragovitz, Edward J. Kelly & R. P. Gibson
ATTORNEYS 3,555,539

ALPHA-NUMERIC DISPLAY DEVICE

William J. Richards, Long Beach, Calif.
(USNATO, APO New York 09667)

Filed Jan. 3, 1968, Ser. No. 695,393
Int. Cl. G08f 5/36
U.S. Cl. 340—324 3 Claims

ABSTRACT OF THE DISCLOSURE

An alpha-numeric display device utilizing a rotating disk or drum having formed therein or thereon characters and coded patterns representing the characters .including sensing means for recognizing the coded patterns and producing corresponding coded output signals which are coupled to an input of a coincidence circuit means. Another input of the coincidence circuit means is coupled to a source of coded input signals. When the coded output signals and coded input signals are identical, the coincidence circuit means functions to activate means for stopping the rotation of the disk or drum whereupon the character called for by the coded input signals is displayed.

The invention described herein may be manufactured, used, and licensed by or for the Government for governmental purposes without the payment to me of any royalty thereon.

Conventional decoding and displaying devices utilizing projection readout employ separate light sources and lens systems for each character to be displayed and have images of the selected characters to be displayed positioned at the focal point of the lens.

An object of this invention is a new and novel decode and display device which eliminates the multiplicity of light sources and lens systems as presently employed in conventional projection readout devices.

Another object of the invention is a new and novel alpha-numeric display device utilizing but one projection system for displaying alphameric characters by rear-projection from a rotating disk or drum onto a screen, including code means formed in the disk, each corresponding to a character on the disk whereby a coded light pattern is formed and sensed by arrays of photoelectric means connected to a coincidence gate to which coded signals are applied.

The invention will be more fully understood and its objects and advantages further appreciated by referring now to detailed description taken in conjunction with the accompanying drawings and in which.

Figure 1:
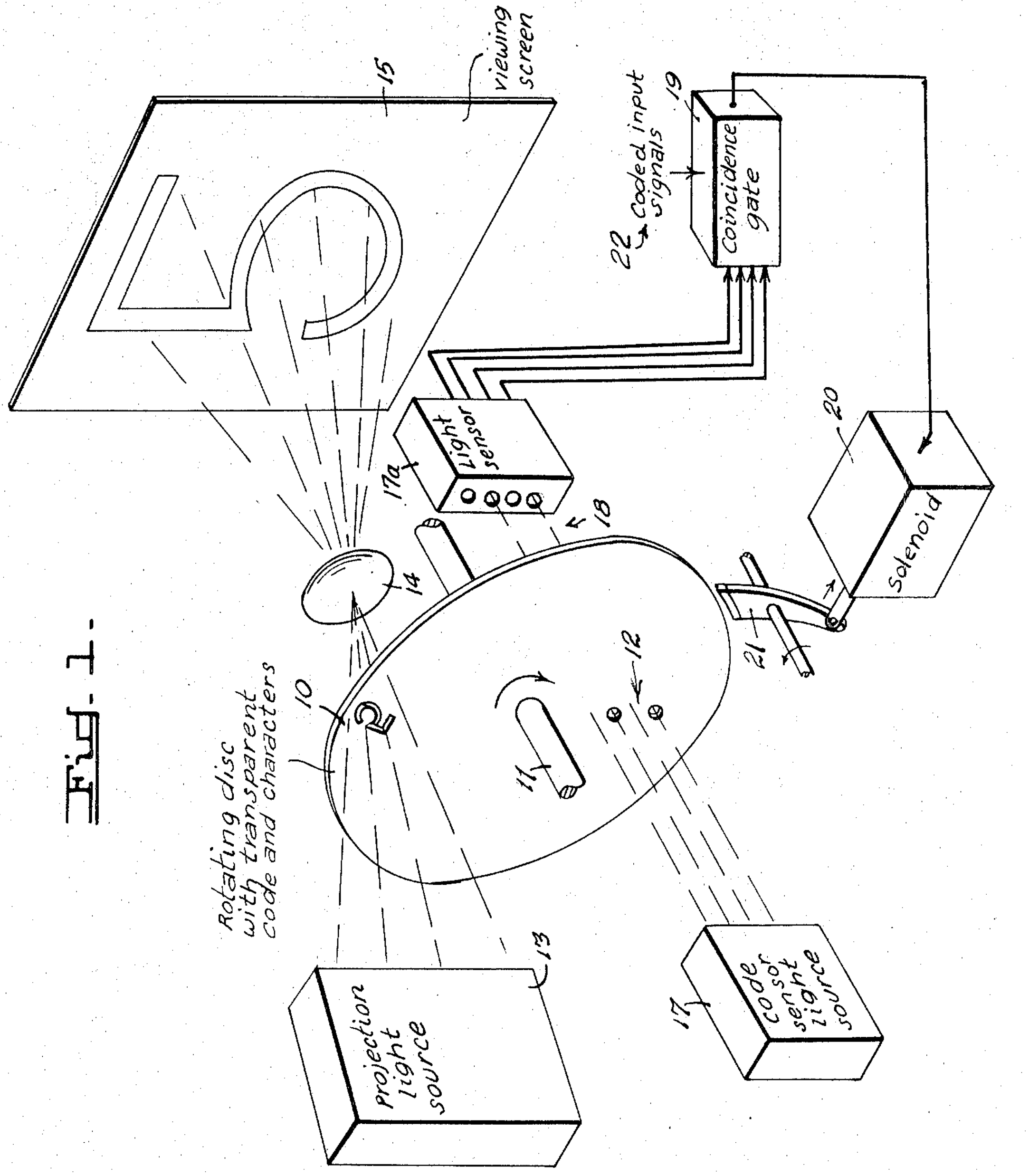
FIG. 1 is a schematic diagram, in perspective of the apparatus embodying the principles of the invention.

Referring now to FIG. 1, 10 indicates a disk mounted on shaft 11 for rotation therewith. Shaft 11 is driven by a motor and coupled thereto by means of a slip clutch. The disk 10 which may be formed from sheet metal having, for example, spaced stamped-out numerals or other characters formed therethrough adjacent the periphery and coded patterns corresponding to the numerals comprising pinholes extending through disk 10. For the sake of simplicity in illustration, there is shown but one stamp-out numeral 5 and its corresponding code pattern 12 consisting of two pin holes located in the disk adjacent its periphery, diametrically opposite to the numeral 5. However, this arrangement is not to be construed as a limitation since if desired or found necessary the numerals and their respective code patterns may be arranged in other relating positions in the disk 10. The disk may also be fabricated from plastic materials having transparent characters and coded patterns printed thereon. A projection light source 13 is spaced from one side of disc 10 in alignment with the numeral to be displayed and spaced from the disk's opposite side is an optical system 14 in alignment with the numeral to be displayed whereby an enlarged view of the character to be displayed is projected onto viewing screen 15. At the instant numeral 5 is in alignment with projection light source 13, the code pattern 12 is aligned with a code sensor light source 17 as are subsequently the other code patterns, located on the same side of disk 10 as projection light source 13. A light sensor 17*a* comprising an arrangement of photoelectric cells which responds to the light beams 18 produced by, for example, code pattern 12 develops coded output signals. The coded input signals 22 are applied to one input of coincidence gate 19 and the coded output signals of light sensor 17*a* are applied to another input of coincidence gate 19. The output signal of coincidence gate 19 is coupled to a solenoid 20 linked to a brake 21 designed to engage the periphery of disk 19.

In operation of the alpha-numeric display device illustrated in FIG. 1, coded signals calling for display of, for example, numeral 5 are applied to one input of coincidence gate 19 while the disk 10 is being rotated by a motor. The thus rotating disc eventually places, for example, code pattern 12 representing numeral 5, in line with the code sensor light source 17 whereupon light passing through the holes in the disk comprising code pattern 12 form light beams projecting onto the photoelectric cells of light sensor 17*a*. The related photoelectric cells then develop coded output signals, corresponding to the code input signals, which are applied to another input of coincidence gate 19 whereupon an output signal is developed at the output of coincidence gate 19. This output signal is coupled to and energizes solenoid 20 causing brake 21 to engage and stop the rotation of disk 10, positioning numeral 5 in line with projection light source 13 and optical system 14 which now projects an enlarged view of numeral 5 onto the viewing screen 15.

Figure 2:
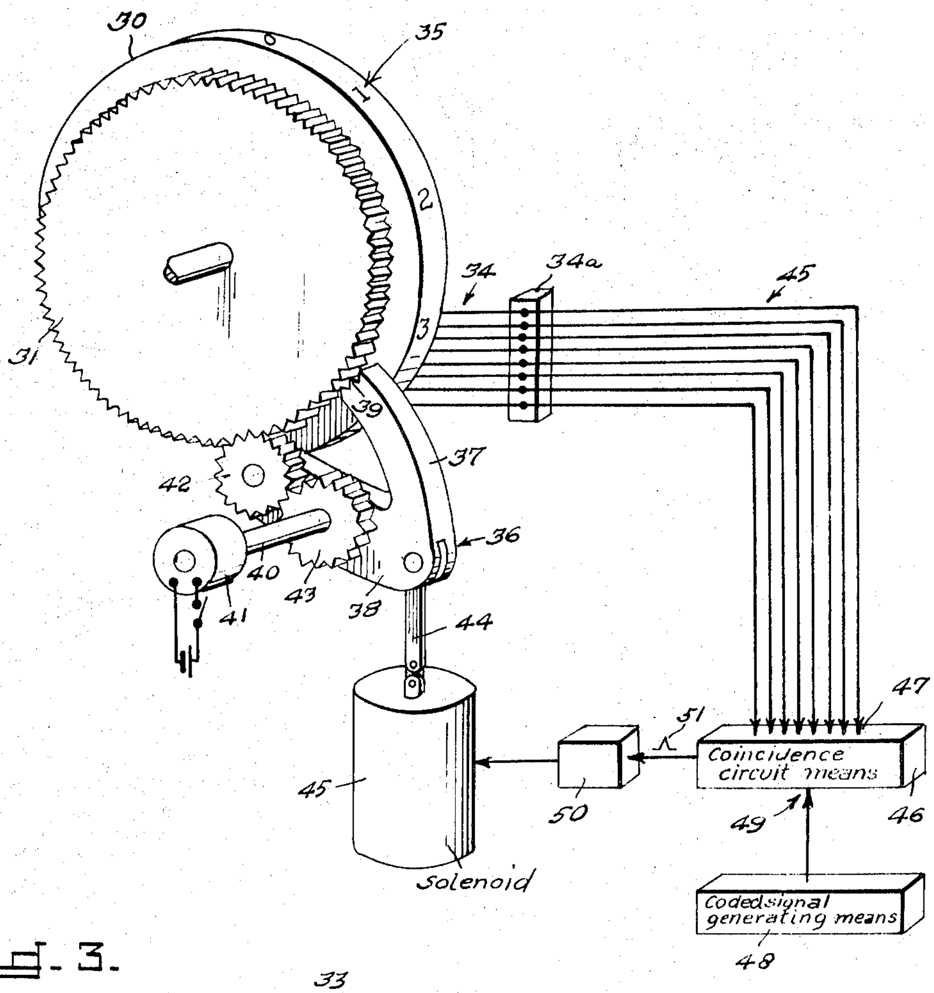
FIG. 2 is a schematic diagram in perspective of another embodiment of the invention.
Figure 3:
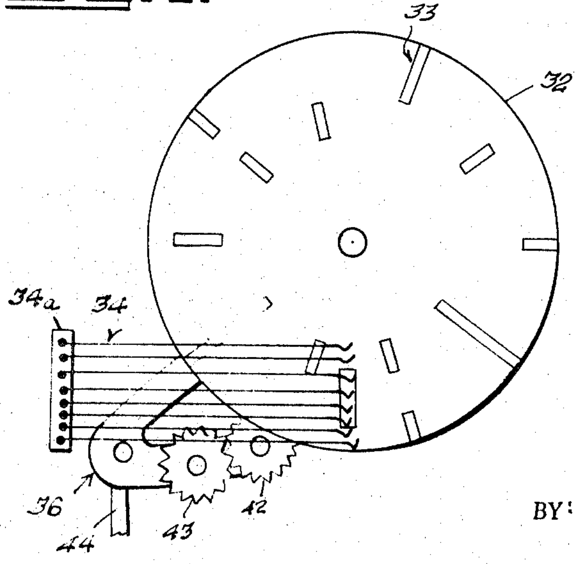
FIG. 3—fragmentary rear view of the drum illustrating the printed circuit code disk.

In the embodiment of the invention illustrated in FIG. 2, the alpha-numeric display device utilizes a rotating drum 30 on the peripheral surface of which are printed or otherwise affixed numbers, letters or symbols of the desired alphabet. One side of the drum 30 is provided with a gear 31 and the opposite side has affixed thereto a printed circuit board in the form of disc 32 upon which are printed binary coded symbols 33 rotating under sensing fingers 34 corresponding to the symbols on the periphery of the drum. Thus if numeral 2 is displayed on the drum, the code for numeral 2 will be simultaneously sensed on the side of the drum bearing the printed circuit code disk 32 by sensing fingers 34. Sensing fingers 34 are mounted on terminal means 34*a*. A pawl 36 is formed with two arms 37 and 38. Arm 37 is terminated in teeth 39 for engagement with gear 31. The pawl 37 is pivotally mounted on shaft 40 driven by motor 41 and has an idler gear 42 mounted therein adjacent the extremity of arm 38 in releasable engagement with gear 31. A driving gear 43 mounted on shaft 40 for rotation therewith drives idler gear 42 causing rotation of drum 30 when idler gear 42 and gear 31 are engaged. Plunger 44 of solenoid 45 is pivotally mounted in an end of arm 38 opposite to the end bearing idler gear 42. Sensing fingers 34 are connected by conductor means 45 to one input of coincidence circuit means 46 as generally indicated by reference numeral 47. Code signal generating means 48 is coupled to another input coincidence circuit means as indicated by reference numeral 49. An electronic switching means 50 energizes solenoid 45 and couples the output of coincidence circuit means 46 with solenoid 45.

In operation of the embodiment shown in FIG. 2, the disk 30 is driven by motor 30 through gears 43, 42 and 31. Solenoid 45 is energized by electronic switching means 50 causing the pawl 36 to pivot about shaft 40 whereby idler gear 42 meshes with gear 31 to drive drum 30. Input coded signals calling for display of a specific character on drum 30 is generated by code signal generating means 48 and applied to an input 49 of coincidence circuit means 46. The disk 30 rotates until sensing fingers 34 contact coded symbols on disk 32 representing specific characters whereby signals coincident with the input coded signals is generated in the input 47 of coincidence circuit means 46 resulting in an autput signal, indicated by reference numeral 51, from coincidence circuit 46 means being applied to and biasing electronic switching means 50 to de-energized solenoid 45. When solenoid 45 is de-energized, the plunger 44 moves outwardly of the solenoid winding causing pawl 36 to rotate about shaft 40 whereby idler gear 42 disengages gear 31 and teeth 39 of arm 37 mesh with gear 31 to stop rotation of the drum, displaying the desired character, for example, numeral 5.

Although several embodiments of the invention have been illustrated and described, it will be understood that this is but illustrative and that various modifications may be made therein without departing from the spirit of the invention and the scope of the appended claims.

I claim:

1. An alpha-numeric display device comprising, a rotating disk, characters to be displayed formed in said disk, coded patterns formed in said disk representing said characters and strategically located therein with reference to the characters, sensing means for recognizing the coded patterns and producing corresponding coded output signals, a comparison circuit having first and second inputs and an output, a coded signal generating source for generating coded input signals corresponding to the coded output signals, means coupling the coded output signals to the second input of the comparison circuit, means coupling the coded input signal to the first input of the comparison circuit, electromechanical means mechanically coupled to braking means associated with the disk and electrically connected to the output of the comparison circuit, the comparison circuit functioning when the coded input signals and the coded output signals are identical to produce an output signal energizing the electro-mechanical means whereby the braking means contacts the disk and stops the rotation thereof whereupon the character corresponding to the coded input signals is positioned for viewing.

2. Alpha-numeric display device for displaying characters in response to coded electrical signals comprising, a disk disengageably driven by a motor, characters to be displayed stamped-out and spaced in the disk adjacent the periphery thereof, a light projection means spaced from one side of the disk for projecting a beam of light on each character when aligned with the beam, a viewing screen, an optical projection system spaced from the side of the disk opposite to said one side for projecting an enlargement of the character illuminated by the beam onto the viewing screen, a coded pattern for each character, each coded pattern comprising an array of minute holes punched in the disk and strategically located therein relative to the character it represents, a light source spaced from said one side of the disk for illuminating the coded patterns when brought into alignment with said light source whereby coded light beams emanate from the minute holes forming a coded light pattern, light sensor means positioned in spaced relationship to the side of the disk opposite said one side and in alignment with said coded light pattern comprising an array of photoelectric cells responsive to the coded light pattern to produce coded output signals, coded input signals source representing the characters, a coincidence gate having two input signal means and one output signal means, said coded input signals source coupled to one of said input signal means, said coded output signals coupled to the other of said input signal means, electromechanical means electrically connected to said output signal means and mechanically coupled to braking means operatively associated with the disc, said coincidence gate functioning when the coded input signals and coded output signals are identical to apply an output signal energizing the electromechanical means whereby the braking means contacts the disk and stops rotation thereof placing the character corresponding to the coded input signals in alignment with the projection light source whereupon said optical projection system projects an enlarged view of the character onto the viewing screen.

3. An alpha-numeric display device for displaying characters in response to coded electrical signals comprising, a drum driven by a motor, characters to be displayed arranged in spaced relationship on the periphery of the drum, a printed circiut disk affixed to one side of the disk having binary coded symbols thereon in spaced relationship corresponding to the characters, a driven gear affixed to another side of the drum, a motor having an exteriorly extending shaft with a driving gear thereon, a pawl formed with first and second arms, the first arm mounted intermediate the ends thereof on the shaft and adapted to be rocked thereon independently of the shaft rotation, one end of said first arm having journaled therein an idler gear in releasable engagement with the driven gear and driven by the driving gear, another end of said first arm pivotally connected to the plunger of a solenoid, the second arm being adapted to engaged the driven gear, a coincidence circuit means having two inputs and an output, coded signal generating means coupled to one of said inputs, sensing finger means coupled to the other of said inputs and adapted to contact the binary coded symbols on said printed circuit disk, electronic switching coupling said output means and said solenoid for energizing said solenoid and subsequently de-energizing said solenoid in response to an output signal from the coincidence circuit means, said coincidence circuit means functioning to produce an output signal biasing the electronic switching means whereby the solenoid is de-energized and the plunger thereof pushes said second arm into contact with the driven gear to stop rotation of the drum to display the character called for by the coded signal generating means when the sensing fingers contact the binary coded symbols representing said character to cause coded signals to be generated in the coincidence circuit means identical to the coded signals applied thereto from the coded signal generating source.

References Cited

UNITED STATES PATENTS

| | | | |
|---|---|---|---|
| 902,792 | 11/1908 | Agrell | 178—38 |
| 2,124,906 | 7/1938 | Bryce | 250—219X |
| 2,652,755 | 9/1953 | Higonnet et al. | 250—219X |
| 2,769,379 | 11/1956 | Perry | 250—219X |
| 3,197,765 | 7/1965 | Simpkin | 340—379X |
| 3,400,387 | 9/1968 | Appleton | 340—324X |

DONALD J. YUSKO, Primary Examiner

D. L. TRAFTON, Assistant Examiner

U.S. Cl. X.R.

340—318, 325, 378